US009043759B1

(12) United States Patent
Lininger

(10) Patent No.: US 9,043,759 B1
(45) Date of Patent: May 26, 2015

(54) SYSTEM AND METHOD FOR GENERATING SOFTWARE UNIT TESTS SIMULTANEOUSLY WITH API DOCUMENTATION

(75) Inventor: Scott Lininger, Lafayette, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 486 days.

(21) Appl. No.: 13/205,828

(22) Filed: Aug. 9, 2011

Related U.S. Application Data

(60) Provisional application No. 61/436,878, filed on Jan. 27, 2011.

(51) Int. Cl.
*G06F 9/44* (2006.01)
*G06F 11/36* (2006.01)

(52) U.S. Cl.
CPC ................... *G06F 11/3672* (2013.01)

(58) Field of Classification Search
None
See application file for complete search history.

(56) References Cited

U.S. PATENT DOCUMENTS

| | | | |
|---|---|---|---|
| 5,754,860 A * | 5/1998 | McKeeman et al. | 717/124 |
| 5,805,795 A * | 9/1998 | Whitten | 714/38.1 |
| 6,249,882 B1 * | 6/2001 | Testardi | 714/38.14 |
| 6,895,578 B1 * | 5/2005 | Kolawa et al. | 717/130 |
| 7,055,067 B2 | 5/2006 | DiJoseph | |
| 7,107,182 B2 * | 9/2006 | Fujikawa et al. | 702/182 |
| 7,246,134 B1 * | 7/2007 | Kitain et al. | 1/1 |
| 7,278,130 B2 | 10/2007 | Iborra et al. | |
| 7,296,264 B2 * | 11/2007 | Zatloukal et al. | 717/143 |
| 7,392,507 B2 * | 6/2008 | Kolawa et al. | 717/124 |
| 7,401,031 B2 | 7/2008 | Hughes | |
| 7,555,742 B2 | 6/2009 | Iborra et al. | |
| 7,681,180 B2 | 3/2010 | de Halleux et al. | |
| 7,941,438 B2 | 5/2011 | Molina-Moreno et al. | |
| 8,006,204 B2 * | 8/2011 | Killian et al. | 717/124 |
| 8,028,276 B1 * | 9/2011 | Bessonov | 717/124 |
| 8,191,048 B2 * | 5/2012 | Parthasarathy et al. | 717/126 |

(Continued)

FOREIGN PATENT DOCUMENTS

EP 1926021 A1 * 5/2008 .............. G06F 11/36

OTHER PUBLICATIONS

Fetzer, Xiao "An automated Approach to Increasing the Robustness of C Libraries"; 2012 IEEE; [retrieved on Jan. 18, 2015]; Retrieved from Internet<URL:http://ieeexplore.ieee.org/stamp/stamp.jsp?tp=&arnumber=1028896&tag=1>;pp. 1-10.*

(Continued)

*Primary Examiner* — Xi D Chen
(74) *Attorney, Agent, or Firm* — Sheridan Ross P.C.

(57) ABSTRACT

A system and method may generate unit tests for source code concurrently with API documentation. The system may receive a source code file including several comments sections. Each comments section may include a description of a source code unit such as a class, method, member variable, etc. The description may also correspond to input and output parameters the source code unit. The system and method may parsing the source code file to determine a source code function type corresponding to the unit description and copy the unit description to a unit test stub corresponding to the function type. A developer or another module may then complete the unit test stub to transform each stub into a complete unit test corresponding to the source code unit. Additionally, the system and method may execute the unit test and generate a test result indication for each unit test.

20 Claims, 7 Drawing Sheets

(56) References Cited

U.S. PATENT DOCUMENTS

| | | | |
|---|---|---|---|
| 8,225,302 | B2 | 7/2012 | Waugh et al. |
| 8,448,146 | B2 | 5/2013 | Pasala et al. |
| 8,601,436 | B2 * | 12/2013 | Park et al. ............... 717/124 |
| 8,776,010 | B2 * | 7/2014 | Fisher et al. ............. 717/106 |
| 2003/0041288 | A1 | 2/2003 | Kolawa et al. |
| 2003/0145312 | A1 * | 7/2003 | Bates et al. .............. 717/106 |
| 2004/0060039 | A1 * | 3/2004 | Fujikawa et al. ......... 717/124 |
| 2005/0120276 | A1 * | 6/2005 | Kolawa et al. ............. 714/38 |
| 2008/0307269 | A1 | 12/2008 | Bennett et al. |
| 2008/0320438 | A1 * | 12/2008 | Funto et al. .............. 717/106 |
| 2009/0070746 | A1 * | 3/2009 | Dhurjati et al. .......... 717/124 |
| 2009/0094580 | A1 | 4/2009 | Bank et al. |
| 2009/0132995 | A1 | 5/2009 | Iborra et al. |
| 2009/0217302 | A1 | 8/2009 | Grechanik et al. |
| 2009/0282136 | A1 * | 11/2009 | Subramanian ............ 709/222 |
| 2009/0313505 | A1 | 12/2009 | McCroskey et al. |
| 2009/0313605 | A1 | 12/2009 | Ostrand et al. |
| 2010/0083069 | A1 | 4/2010 | Wylie et al. |
| 2010/0242015 | A1 * | 9/2010 | Stenberg et al. .......... 717/106 |
| 2010/0325620 | A1 | 12/2010 | Rohde et al. |
| 2011/0016453 | A1 | 1/2011 | Grechanik et al. |
| 2011/0016457 | A1 | 1/2011 | Artzi et al. |
| 2011/0022551 | A1 | 1/2011 | Dixon |
| 2011/0161932 | A1 | 6/2011 | Nagappan et al. |
| 2011/0166969 | A1 | 7/2011 | Hughes |
| 2011/0307860 | A1 * | 12/2011 | Park et al. ............... 717/107 |
| 2013/0031423 | A1 | 1/2013 | Barrow et al. |
| 2013/0106880 | A1 * | 5/2013 | Williams ................. 345/522 |
| 2013/0152047 | A1 * | 6/2013 | Moorthi et al. ........... 717/124 |
| 2014/0007043 | A1 * | 1/2014 | Aliseychik et al. ........ 717/106 |

OTHER PUBLICATIONS

Torchiano, "Documenting Pattern Use in Java Programs"; 2002 IEEE;[retrieved on Jan. 18, 2015]; Retrieved from Internet<URL:http://ieeexplore.ieee.org/stamp/stamp.jsp?tp=&arnumber=1167770>;pp. 1-4.*

Shafique, Labiche, A Systematic Review of Model Based Testing Tool Support'; 2010, Technical Report of Carleton University; [retrieved on Jan. 18, 2015]; Retrieved from Internet<URL:http://people.scs.carleton.ca/~jeanpier/404F13/T7%20-20survey%20papers/SystematicReviewOfMBT-2010.pdf>;pp. 1-21.*

Trucchina, Romei, "Refactoring Tools—Chapter of book 'Pro PHP Refactoring'"; Springer 2010; [retrieved on Jan. 18, 2015]; Retrieved from Internet<URL:http://link.springer.com/chapter/10.1007/978-1-4302-2728-1_6>;pp. 63-84.*

Mangold et al., "Automatic Unit Testing of SAS Programs with SASUnit," PhUSE Conference, 2008, 11 pages.

"Parameterized Unit Testing with Microsoft Pex: Advanced Tutorial for Automated Whitebox Testing for .NET Applications," Version 0.93, Aug. 3, 2010, 48 pages.

U.S. Appl. No. 13/216,401, filed Aug. 24, 2011, Nicolo.

Arrington Jr. "Improving Software Testing through Code Parsing," Virginia Space Grant Consortium Student Research Conference, Apr. 9, 2009, Hampton University, Hampton, Virginia, 5 pages.

Official Action for U.S. Appl. No. 13/216,401, mailed Mar. 14, 2014, 23 pages.

Bevan et al. "Identifiaction of Software Instabilities," Proc. of 2003 Working Conference on Reverse Engineering (WCRE2003), Victoria, Canada, 2003, 10 pages.

Cubranic et al. "Hipikat: Recommending Pertinent Software Development Artifacts," Proc. of 25th International Conference on Software Engineering (ICSE), Portland, Oregon, 2003, pp. 408-418.

Fischer et al. "Populating a Release History Database from Version Control and Bug Tracking Systems," Proc. of 2003 Int'l Conference on Software maintenance (ICSM'03), 2003, pp. 23-32.

Gall et al. "CVS Release history Data for Detecting Logical Couplings," Proc. of Sixth International Workshop on Principles of Software Evolution (IW-PSE'03), 2003, pp. 13-23.

Gall et al. "Detection of Logical Coupling Based on Product Release History," Software Maintenance, 1998, 9 pages.

Graves et al. "Predicting Fault Incidence Using Software Change History," IEEE Transactions of Software Engineering, vol. 26, No. 7, Jul. 2000, pp. 653-661.

Hassan et al. "The Top Ten List: Dynamic Fault Prediction," Proc. of International Conference on Software Maintenance (ICSM 2005), Budapest, Hungary, 2005, pp. 263-272.

Hatton "Reexamining the Fault Density-Component Size Connection," IEEE Software, 1997, 9 pages.

Kim et al. "Automatic Identification of Bug-Introducing Changes," Proc. of 21st IEEE International Conference on Automated Software Engineering (ASE 2006), Tokyo, Japan, 2006.

Kim et al. "Predicting Faults from Cached History," IEEE, 29th International Conference on Software Engineering (ICSE'07), 2007, 10 pages.

Ko et al. "A Framework and Methodology for Studying the Causes of Software Errors in Programming Systems," Journal of Visual Languages and Computing, vol. 16, 2005, pp. 41-84.

Mockus et al. "Identifying Reasons for Software Changes Using Historic Databases," Proc. of Internatioanl Conference on Software Maintenance (ICSM 2000), San Jose, California, 2000, pp. 120-130.

Nagappan et al. "Use of Relative Code Churn Measures to Predict System Defect Density," Proc. of 205 Int'l Conference on Software Engineering (ICSE 2005), St. Louis, Missouri, May 15-21, 2005, pp. 284-292.

Ostrand et al. "Predicting the Location and Number of Faults in Large Software Systems," IEEE Transactions on Software Engineering, vol. 31, No. 4, Apr. 2005, pp. 340-255.

Sliwerski et al. "When Do Changes Induce Fixes?" Proc. of Int'l Workshop on Mining Software Repositories (MSR 2005), St. Louis, Missouri, May 17, 2005, 5 pages.

International Search Report and Written Opinion for Appilcation No. PCT/US2012/046949, dated Dec. 27, 2012.

Official Action for U.S. Appl. No. 13/216,401, mailed Sep. 19, 2014, 62 pages.

Official Action for U.S. Appl. No. 13/190,599, mailed Dec. 19, 2013, 11 pages.

Official Action for U.S. Appl. No. 13/190,599, mailed Jun. 3, 2014, 13 pages.

Marinescu "Detection Strategies: Metrics-Based Rules for Detecting Design Flaws," Proceedings of the 20th IEEE International Conference on Software Maintenance, 2004, 10 pages.

Official Action for U.S. Appl. No. 13/216,401, mailed Apr. 1, 2015 48 pages.

Official Action for U.S. Appl. No. 13/190,599, mailed Feb. 9, 2015 18 pages.

* cited by examiner

```
/**
 * @par Ruby Method:   Vector3d.linear_combination  —205
 *                     rvector3d.cpp
 * @file
 *
 * The linear_combination method is used to create a new vector as a linear
 * combination of other vectors . This method is generally used to get a vector
 * at some percentage between two vectors .
 *
 * A linear combination is a standard term for vector math . It is defined as
 * point = weight1 * point1 + weight2 * point2.
 *
 * In addition to the 4-argument form detailed here , you may also call this
 * method with 6 parameters in the form of :
 *   - vec = Geom::Vector3d.linear_combination (x, xaxis, y, yaxis, z, zaxis)
 *
 * @version           SketchUp 6.0
 * @param weight1     A weight or percentage .
 * @param vector1     The first vector .
 * @param weight2     A weight or percentage .
 * @param vector2     The end point of the line .
 * @return
 *                    vector - a Vector3d object
 * @par Example :—206
 * @code—208
 *   # Create a vector that is a 50%/50% linear combination of two others—212
 *   vec1 = Geom::Vector3d.new 3,0,0 —204
 *   vec2 = Geom::Vector3d.new 0,3,0
 *   new_vector = Geom::Vector3d.linear_combination(0.5, vec1, 0.5, vec2)
 *
 *   # new_vector will now contain a Vector3d(1.5, 1.5, 0)   —214
 * @endcode—210
 */
```

212           202

```
#  ----------------------------------------------------------------
#  @par Ruby Method:    Vector3d.linear_combination
#  @file                rvector3d.cpp

#  Args:
#  - weight1: A weight or percentage.
#  - vector1: The first vector.
#  - weight2: A weight or percentage.
#  - vector2: The end point of the line.

#  Returns:
#  - vector: a Vector3d object

# Test the example code that we have in the API documentation.
# PASS                            ── 316
def test_linear_combination_api_example    ── 301
    raise('AUTOGENERATED STUB. Do manual review, then delete this warning.')  ── 304
    assert_nothing_raised do
        # Create a vector that is a 50%/50% linear combination of two others.
        vec1 = Geom::Vector3d.new 3,0,0
        vec2 = Geom::Vector3d.new 0,3,0      ── 204
        new_vector = Geom::Vector3d.linear_combination(0.5, vec1, 0.5, vec2)
        # new_vector will now contain a Vector3d(1.5, 1.5, 0)
    end
    assert_equal('expected', 'result',
                 'Failed in test_linear_combination' )   ── 306
end

# Test edgecases for values passed to this method.
# FOLLOW UP  ── 318
def test_linear_combination_edgecases
    raise('AUTOGENERATED STUB. Do manual review, then delete this warning.')  ── 312
    assert_equal('expected', 'result',
                 'Failed in test_linear_combination_edgecases' )
end

# Test what happens when bad arguments are passed (nil, too few, etc.)
# FAIL  ── 320
def test_linear_combination_bad_params
    raise('AUTOGENERATED STUB. Do manual review, then delete this warning.')  ── 314
    assert_raise RuntimeError do
        # bad arguments here that should cause errors
    end
end
```

FIG. 3

SYSTEM AND METHOD FOR GENERATING SOFTWARE UNIT TESTS SIMULTANEOUSLY WITH API DOCUMENTATION

CROSS-REFERENCE TO RELATED APPLICATION

The present application claims the benefit of U.S. Provisional Patent Application No. 61/436,878 filed Jan. 27, 2011, the disclosure of which is incorporated herein by reference in its entirety for all purposes.

TECHNICAL FIELD

The present disclosure generally relates to a system and method for generating unit tests during software development and, more particularly, to generating unit tests from the documentation and comments portions of high-level computer code.

BACKGROUND

Software programs or applications typically include several different functions, modules, methods, etc. (i.e., "units") that interact by accessing and using shared resources. Generally speaking, a unit may be described as the smallest testable portion of an application such as a function or procedure. On a larger scale, applications themselves are written so that other programs may be written to access and use the application's resources. To understand existing applications and to develop new applications that add functionality to these existing applications, an application programming interface (API) is often developed to aid future development. An API defines the rules and specifications for a software program so that other programs can be designed to use the various resources of that program. In other words, the API operates as an interface between programs.

To assist other programmers in creating compatible programs, each application typically includes an API while the source code for each unit within the application includes comments that describe the unit. For example, the comments may generally describe the classes, methods and objects within a unit of the source code as well as the inputs and outputs expected during that unit's execution. In conjunction with the API, these unit comments may guide developers as they write compatible applications or expand the application.

However, an API may be difficult and time-consuming to write. As the complexity of the source code grows, an API describing the source code will also become more complex. Numerous systems may automatically generate APIs and other documentation in a common format (e.g., HTML) directly from the API's source code. For example, commercial tools like Javadoc ("JDoc") from Oracle Corporation, or open source tools such as JSDoc and Doxygen parse the source code and source code comments into hyperlinked HTML API documents.

In addition to the API, testing is often necessary to develop effective and efficient computer code. The process of testing code typically includes testing various units of the application in isolation from the other units of the application as the programmer writes the source code for the application. Testing normally involves writing a short application that utilizes the code that is the subject of the test. This short application includes a rigorous contract that the test subject source code must satisfy when it is executed. If the test is written correctly and the contract is satisfied, then the developer is more confident that the test subject source code will perform correctly for any other user or developer. Testing usually proceeds in isolation for each unit of the source code. If all units of an application pass the unit tests in isolation, then the application as a whole will execute as desired when all units are included.

While several tools exist to automatically write an API for a finished application, unit tests are written by the developer in the same manner as the source code, often while the source code for the unit is written, or at some time after the source code is finished. As an application increases in complexity, the number of unit tests increases. Because developers must write each unit test in the same manner as the source code, unit testing becomes a tedious and complex process for even the simplest of applications. Understanding whether testing for complex applications that include many testable units is successful or complete can also be confusing and time consuming.

SUMMARY

A unit test generation tool may automatically generate unit tests for source code based on the API and comments within the source code. The unit test generation tool may shorten and improve the normally tedious process of unit testing. For each Method and Class in an API, a developer may write a description and example directly into the source code comment blocks. These comment blocks may be parsed and tokenized by a documentation generation tool or the unit test generation tool itself to create HTML (or any other format) help files. The unit test generation tool may then automatically generate unit tests and unit test stubs for an entire API.

In one embodiment, the unit test generation tool may read the source code files for an application and pull out information about each method and class to build a data structure for the application and its API that includes tokens for each method and class. The data structure may describe the source code methods and acceptable method parameters, and any blocks of example usage code that have been embedded into the source code comment blocks. The unit test generation tool may then provide test stubs that include a template of the typical code that a complete unit test suite normally includes. This template may be read into memory and parts of the template may be replaced with the tokens for the methods and classes. The unit test generation tool may then output a set of new files containing unit tests that match every example in the source code comments as well as common unit test stubs that provide a starting point for developers as they fully unit test the end API.

In one embodiment, a computer-implemented method may generate unit tests for source code, The method may receive a source code file including a comments section, the comments section including a keyword identifying a unit description. The method may also read the unit description from the source code file, wherein the unit description follows the keyword, and copy at least a portion of the unit description to a unit test stub. The unit test stub may include a declaration of a testing routine and parameters accepted by the testing routine, the parameters including the unit description.

In a further embodiment, a tangible computer-readable medium may store instructions that, when executed by a processor, cause the processor to receive a source code file including a comments section, the comments section including a keyword identifying a unit description, wherein the unit description corresponds to input and output parameters of a source code unit and the unit description follows the keyword in the source code file. The instructions may also cause the processor to serialize the source code file, parse the serialized source code file to identify the keyword, and write at least a portion of the unit description following the keyword to a unit test stub. The unit test stub may also include a declaration of a testing routine and the unit description written to the unit test stub.

Another embodiment may include a computer system for generating unit tests. The system may comprise several modules. A source code database interface module may be configured to store in a database a plurality of source code files. Each file may include a keyword identifying a unit description, wherein the unit description corresponds to input and output parameters of a source code unit and the unit description follows the keyword in the source code file. A unit test generator module may be configured to read a unit description, to determine a function type corresponding to the unit description, and to copy the unit description to a unit test stub corresponding to the function type. A unit test suite may be configured to store a plurality of unit test stubs corresponding to each source code unit and to receive additional code to transform each unit test stub into a unit test corresponding to a source code unit. Also, a unit test harness may be configured to execute the plurality of unit tests and to provide a test result indication for each unit test.

Another embodiment may include a computer-implemented method for generating unit tests for source code. The method may receive a source code file including a keyword identifying a unit description, wherein the unit description corresponds to input and output parameters of a source code unit and the unit description follows the keyword in the source code file. The method may also parse the unit description to determine a source code function type corresponding to the unit description and copying the unit description to a unit test stub corresponding to the function type. Also, the method may receive additional code to transform each unit test stub into a unit test corresponding to the source code unit, execute the unit test, and generate a test result indication for each unit test.

Another embodiment may include a tangible computer-readable medium storing instructions that when executed by a processor cause the processor to perform various tasks. For example, the instructions may cause the processor to receive a source code file including a keyword identifying a unit description, wherein the unit description corresponds to input and output parameters of a source code unit and the unit description follows the keyword in the source code file. The instructions may also cause the processor to parse the unit description to determine a source code function type corresponding to the unit description and copy the unit description to a unit test stub corresponding to the function type. Additionally, the instructions may cause the processor to receive additional code to transform each unit test stub into a unit test corresponding to the source code unit, execute the unit test, and generate a test result indication for each unit test.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 2 illustrates an example text representation of code within a source code file in accordance with the described embodiments;

FIG. 3 illustrates an example text representation of unit test stubs and unit tests generated by the unit testing system in accordance with the described embodiments;

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
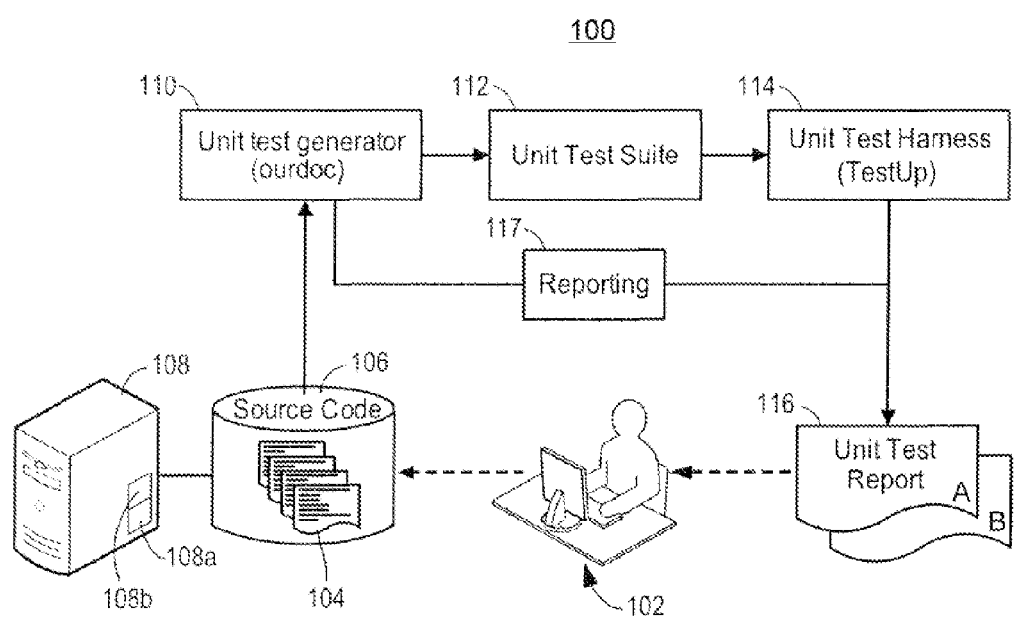
FIG. 1 illustrates a block diagram of an exemplary unit testing system in accordance with the described embodiments.

FIG. 1 illustrates a block diagram of a high-level architecture of a unit test generation system 100 including various software and hardware components or modules that may be employed to automatically generate unit tests for source code using comments written into the source code. The various modules may be implemented as computer-readable storage memories containing computer-readable instructions (i.e., software) for execution by a processor of a computer system. The modules may perform the various tasks associated with generating unit tests from source code files, as herein described. The system 100 also includes both hardware and software applications, as well as various data communications channels for communicating data between the various hardware and software components.

A developer 102 may write source code 104 for a computer program using a general text editing program (e.g., notepad, WordPad®, etc.), an integrated development environment (IDE) (e.g., NetBeans®, CodeLite, JBuilder®, etc.), or other program executing on a computing device. The developer 102 may store the source code 104 within a local or remote database 106 as a text file or type of file. In some embodiments, the database 106 is a component of a server 108 or other computing device including both a processor 108a and memory 108b. FIG. 2 illustrates one example of a portion of source code 104, in particular, a comments section 200 of a source code file 104. A comments section 200 includes text that is ignored by source code compilers and interpreters, but may provide useful information to developers who edit, optimize, or use the source code 104. The information in the comments portions 200 may make the source code 104 easier to understand for developers 104 to write other code that is compatible with the source code 104. Each programming language's specification includes syntax and rules for using comments so that the text is ignored during compilation or interpretation. For example, both Java® and C-based languages use a double forward slash ("//") or a forward slash and asterisk combination ("/***/") notation as illustrated by FIG. 2. As a Java or C compiler or interpreter parses a line of code beginning these particular characters, the compiler or interpreter will ignore that line of code.

In some embodiments, the comments section 200 includes an example section 202 within the comments section. The example section 202 may include a unit description 204 (e.g., a method description, a member variable description, or other text) that may be useful in an API corresponding to the source code file. For example, the unit description 204 may include a portion of code that, if executed, would provide expected results from a function, method, class, or other unit of code from the source code file. As illustrated by FIG. 3, the unit description 204 provides code to determine an expected result from the "Vector3d.linear_combination" method 205. The comments section may also include a beginning keyword and an ending keyword as well as additional text portions further describing the method 205 and the unit description 204 of the example section 202 (e.g., additional comments 212 and 214). Each unit description 204 may also correspond to a unit of source code (i.e., the smallest testable portion of the application encoded in the source code file 104).

Returning to FIG. 1, the a unit test generation system 100 may also include several components or software modules and instructions stored in a computer-readable storage memory and executed on a processor (e.g., 108b and 108a or similar structures within a local computer user by the developer 102) to generate unit tests using one or more comments sections 200 within a source code file 104. In some embodiments, a module or component organizes and formats the source code, and generates unit test stubs (called the unit test generator module 110 or "ourdoc" module 110). In some embodiments, the ourdoc module 110 includes one or more instructions stored in a computer-readable storage memory and executed on a processor to access the database 106 or other data storage and retrieve a source code file 104 that includes one or more comments portions 200. Alternatively, the ourdoc module 110 receives a source code file 104 or a portion of the source code file 104 including one or more comments sections 200. The ourdoc module 110 may also include one or more instructions stored in a computer-readable storage memory and executed on a processor to convert the source code file 104 into another format for analysis. For example, the ourdoc module 110 may convert the file 104 into a stream of text or other data (e.g., serialize the file 104), search through the stream of text, and either break it up into useful chunks of information (i.e., tokens) or reformat the file 104 for analysis.

The ourdoc module 110 may also include one or more instructions stored in a computer-readable storage memory and executed on a processor to identify a comment section 200 within the source code file 104 and output one or more files using the comment section 200 as input. In some embodiments, the ourdoc module 110 identifies notation within the source code file 104 that indicates a comment section 200. For example, the ourdoc module 110 may identify any line of text within the source code file 104 beginning with "//" or "/* . . . */" notation as a portion of a comment section 200. Once the ourdoc module 110 identifies comment notation, then the text within the comment section 200 may be further analyzed. For example, the ourdoc module 110 may include one or more instructions stored in a computer-readable storage memory and executed on a processor to identify a particular character or token within the comments section that may be passed as an argument to another instruction stored in a computer-readable storage memory and executed on a processor.

The comments section 200 may be formatted in an industry standard that permits developers to quickly write comments so that they may be used to create public documentation. In some embodiments, the comments section 200 is written in the "Doxygen" format. For example, a particular character (e.g., an "@" character, a "%" character, etc.) and name combination (i.e., a command or keyword) within the comments section 200 may indicate that text following that character has particular meaning to create public documentation, unit tests, etc. One example of a command or keyword 212 includes "@version" and text following this keyword may include "SketchUp 6.0" to indicate that the comments section 200 corresponds to version six of the SketchUp application. Following the Doxygen format, the ourdoc module 110 may include one or more instructions stored in a computer-readable storage memory and executed on a processor to create public documentation. In some embodiments, the public documentation is an HTML, XML, or other type of uniformly-formatted document that describes the classes, class hierarchy, class members, etc., that correspond to the various classes listed in the comments section 200.

The ourdoc module 110 may also extend the Doxygen format to include keywords that are used to create unit tests. For example, the ourdoc module 110 may define various commands and keywords to extend Doxygen functions. In one embodiment, a "@par Example" ourdoc command 206 may be read and used as an input to a method of the ourdoc module 110 to indicate the beginning of comments that describe an ideal execution of the source code. Further, comments following the "@par Example" keyword may include Doxygen keywords and commands that may be read and used as an input to other methods of the ourdoc module 110. For example, "@code" and "@endcode" Doxygen commands may be used by both Doxygen and ourdoc module 110 methods to produce different results. As used by Doxygen, a block of comments beginning with a "@code" 208 command and ending with a "@endcode" command 210 may produce a public documentation file wherein Doxygen interprets the comments within the example section 202 as code. Within the Doxygen-produced public documentation file, the names of the classes and members that are documented within the unit description 204 will be replaced by references to the documentation for those particular classes and members.

The ourdoc module 110 may include one or more instructions stored in a computer-readable storage memory and executed on a processor to use the "@code" and "@endcode" commands as a signal to create unit tests for the classes and members described in the comments that follow the "@code" command and are before the "@endcode" command (i.e., the unit description 204). With further reference to FIG. 3, the ourdoc module 110 may include instructions to generate unit test stubs 300 from the example section and store the stubs within a unit test suite 112. In some embodiments, a unit test stub 300 consists of a declaration of a testing routine 301 and input and output parameters accepted by the testing routine 204. The unit test stubs 300 may be used as placeholders for routines that need to be developed to fully test the source code. For example, the unit test stubs 300 may include only enough code to allow the stubs 300 to be compiled and linked with the rest of the unit test suite 112. Additional functionality may be added to the stubs 300 by adding more code. In some embodiments, the ourdoc module 110 copies the unit description 204 into a unit test stub 300, wherein the parameters accepted by the testing routine of the stub 300 include at least the unit description 204. Further, a developer 102 or another module or routine may add more code to the stubs 300 to augment the unit test.

The unit test suite 112 may include all of the unit tests for an application. The ourdoc module 110 may generate a variety of unit tests for the unit test suite 112 from each unit description 204 such that the tests represent the various categories of common coding problems and the tests cover a high degree of execution results for the source code file 104. For example, the ourdoc module 110 may create unit test stubs for trivial source code cases, but also for other categories of method and member inputs such as boundaries, bad input types, random inputs, negative tests, etc.

The ourdoc module 110 may also analyze the unit description 204 to determine to what type of function the unit description 204 corresponds. For example, the unit description 204 may correspond to parameters of a "setter" function (i.e., source code expressions that establish a value such as "var=2"), a "getter" function (i.e., source code expressions that retrieve an established value such as "return var"), or other type of function in the source code for which a unit test is desired. After determining what type of function corresponds to the unit description 204, the ourdoc module 110 may include one or more instructions stored in a computer-readable storage memory and executed on a processor to generate a unit test stub 300 corresponding to the function type (i.e., a setter unit test, a getter unit test, etc.). For example, when the ourdoc module 110 serializes or tokenizes and parses the unit description 204, the ourdoc module 110 may identify a "=" symbol corresponding to a "setter" function. Once identified as a setter function, the ourdoc module 110 may generate setter unit tests. When the ourdoc module 110 identifies the word "return", which corresponds to a "getter" function, the module 110 may generate getter unit tests. Of course, the ourdoc module 110 may include other instructions to identify and generate other types of unit tests depending on particular symbols, words, commands, keywords, etc., the module 110 identifies within the unit description 204.

Regardless of the type of unit tests the module 110 generates, each set of unit tests may include at least a trivial test of the unit description 204 that is generated from the comment section 200 and other categories of unit tests. With reference to FIG. 3, the test stubs 300 may include a trivial unit test 302, a boundary or "edge case" unit test 304, a bad parameters unit test 306, and other unit tests (e.g., random inputs, negative tests, etc.). Depending on the type of unit tests identified (e.g., setter or getter unit tests, etc.), the test stubs 300 may include different instructions corresponding to the type of unit in the unit description 204. For example, if the ourdoc module 110 identifies the unit description 204 as a "setter", then instructions of the module 110 may generate a trivial unit test 302 having commands corresponding to the "setter" instructions of the comments section 200. The commands may correspond to typical "raise" 304 and "assert" 306 commands to test the setter method from the unit description 204 of the comments section 200. For example, the assert command 306 for the setter method from the source code file 104 corresponding to the unit description 204 tests if the "expected" value and the "result" value of the "new_vector" variable are equal. If the expected and actual values are not equal, then the unit test fails. Further, the assert command for a getter method from a unit description may test if the returned parameter is the same type as the expected parameter. If the expected and returned types are not equal, then the unit test fails. In any case, if the expected and actual values of a tested variable (i.e., the "new_vector" variable illustrated in FIGS. 2 and 3 or any other variable) are equal, then the unit test succeeds.

In some embodiments, the ourdoc module 110 may automatically add a test stub 300 to check the ability of the function to generate an expected type of error when executed. For example, when the ourdoc module 110 analyzes the unit description 204 and identifies it as a getter function, the test stub 300 for a "get_coordinates" function may apply an invalid coordinate point as an input to the function to ensure that an "Exception::ArgumentError" would be received, as expected. In contrast, when the ourdoc module 110 identifies a function as a setter, different kind of errors may be expected depending on what the function sets. For Example, an "Exception::TypeError" error may be expected from a "set_coordinates" function that, when executed, receives a "string" type input when the function only accepts an "integer" type input.

In other embodiments, the ourdoc module 110 may identify setter or getter functions that return Boolean values and generate an appropriate test stub 300. For example, the ourdoc module 110 may identify a Boolean getter function within the unit description 204 with a particular character (e.g., a '?' character such as "MyClass.is_visible?"). The ourdoc module 110 may then output a test stub 300 for the Boolean getter to ensure the function result is not null (i.e., a stub "result_is_not_null( )") and that the result is one of "true" or "false" (i.e., a stub "result_is_true_or_false( )"). Of course, the ourdoc module 110 may include instructions to generate other types of unit tests that are specific to the function type, such as testing that a parameter was correctly set by a setter function or that a getter function correctly retrieves the expected type of parameter, random inputs, negative tests, etc.

As indicated in FIG. 3, each of the unit test stubs 300 includes comments within a raise command 304, 312, 314. These comments may be automatically generated with the unit test stubs 300. In some embodiments, the comments within the raise commands 304, 312, 314 may indicate to a developer that further action should be taken to complete each unit test 302, 308, 310 so that the unit test stubs 300 may be completed so that each unit of the source code file 104 is properly tested and the unit test stubs 300 form complete unit tests. For example, a developer 102 may add code to each unit test stub 300 so that the stub 300 represents a complete unit test corresponding to a unit of the source code file 104. Of course, another module (e.g., the ourdoc module 110) may also automatically add code to each unit test stub 300 and transform each stub 300 into a complete unit test corresponding to a unit of the source code file 104. Each unit may be properly tested when it passes its unit tests including at least a unit test corresponding to its description 204, boundaries unit tests, and bad input unit tests. These comments may be deleted by the developer to indicate when the developer has completed a review of the unit tests 302, 308, 310. In further embodiments, the developer may edit (i.e., add, delete, or change) the text of the unit tests 302, 308, and 310 so that each unit is properly tested.

Again referring to FIG. 1, a module 114 may test each of the unit tests 302, 308, 310 within the unit test suite 112. The module or "test harness" 114 may determine whether the unit tests have been properly completed for each unit identified within the corresponding source code file 104. In some embodiments, a module entitled "TestUp" may serve as the unit test harness 114. The TestUp module may be external to the application represented by the source code 104. In further embodiments, the TestUp module 114 may simulate services or functions that are not available in the test environment. For example, where the application represented by the source code 104 is an internet-deployed application requiring one or more web servers, the TestUp module 114 may include functions or routines that simulate web server communication such that the units of the source code 104 may be properly tested. Likewise, the TestUp module 114 may generally provide an environment in which all units of the source code 104 are properly tested. In some embodiments, the TestUp module 114 runs each unit test as it is created within the unit test suite 112 to determine how much of the source code file 104 is properly tested. The TestUp module 114 may provide a test result indication (e.g., a pass, fail, or follow up indication) 316 for each unit test within the unit test suite 112.

After testing each completed unit test 300 within the unit test suite 112, the ourdoc module 110, the TestUp module 114, a reporting module 117, or another module may generate unit test coverage reports 116a and 116b. The reports 116a and 116b may provide an indication of how much source code file 104 testing is complete and may also modify the unit test stubs 300 to indicate whether a particular unit test passed, failed, or needs further development. For example, if a unit test passes after being executed by the TestUp module 114, then the text corresponding to that passed test 302 within the unit test suite 112 may be highlighted in green or another indication. Likewise, if a unit test requires follow up 308 after being executed by the TestUp module 114, then the text corresponding to that test within the unit test suite 112 may be highlighted in yellow or another indication. Also, if a unit test fails 310 after being executed by the TestUp module 114, then the text corresponding to that failed test within the unit test suite 112 may be highlighted in red or another indication. Text or another indication may also be inserted into the unit tests 300 after execution by the TestUp module 114 indicating pass 316, follow up 318 or fail 320.

The unit test coverage reports 116a and 116b may also include an indication of how thoroughly and effectively the unit test suite 112 tests the units identified within the source code file 104. In some embodiments, the reports 116a and 116b may be an output of the TestUp module 114 or the ourdoc module 110, or a reporting module 117. The reports 116a and 116b may be sent to the developer 102 and include several indications about the source code 104 and the unit testing process. For example, the unit test reports 116a and 116b may include an indication of whether each unit test (e.g., unit tests 302, 308, 310) properly tests its corresponding source code unit (the parameters of which are described in the comments section 200 of the source code file 104), an indication of how many of the total number of unit tests described within the comments sections 200 of the source code file 104 are properly tested, and a coverage measure indicating how much of the testing process is complete, to name only a few of the indications that may be available in the reports 116a and 116b.

In some embodiments, a reporting module 117 may extract a list of source code units (e.g., the names of the classes and methods) from the comments sections 200 of the source code file 104 and correlate that list with the number of unit tests that passed when executed by the TestUp module 114 to determine a measure of testing coverage 402 For example, the reporting module 117 may parse the comments sections 200 of a source code file 104 to extract each method name 205 or class name, and copy each extracted method or class name to a list. The reporting module 117 may then compare the list of methods and classes against the method and classes tested by the TestUp module 114. The TestUp module 114 may create a list of classes and methods it tests as the tests are run and provide that list to the reporting module 117. The reporting module may then compare the lists to the indication of whether each particular unit test passed to generate a measure of testing coverage 402 for each class. The coverage measure 402 may generally describe how many units within a class are covered by unit tests that pass or succeed. For example, a report indicating sixty-eight percent test coverage may specify that, of a total of one hundred functions within a class, sixty-eight of those functions are tested properly and pass those tests (i.e., the unit test suite 112 includes unit tests that pass for sixty eight of one hundred total units within the class).

Figure 5:
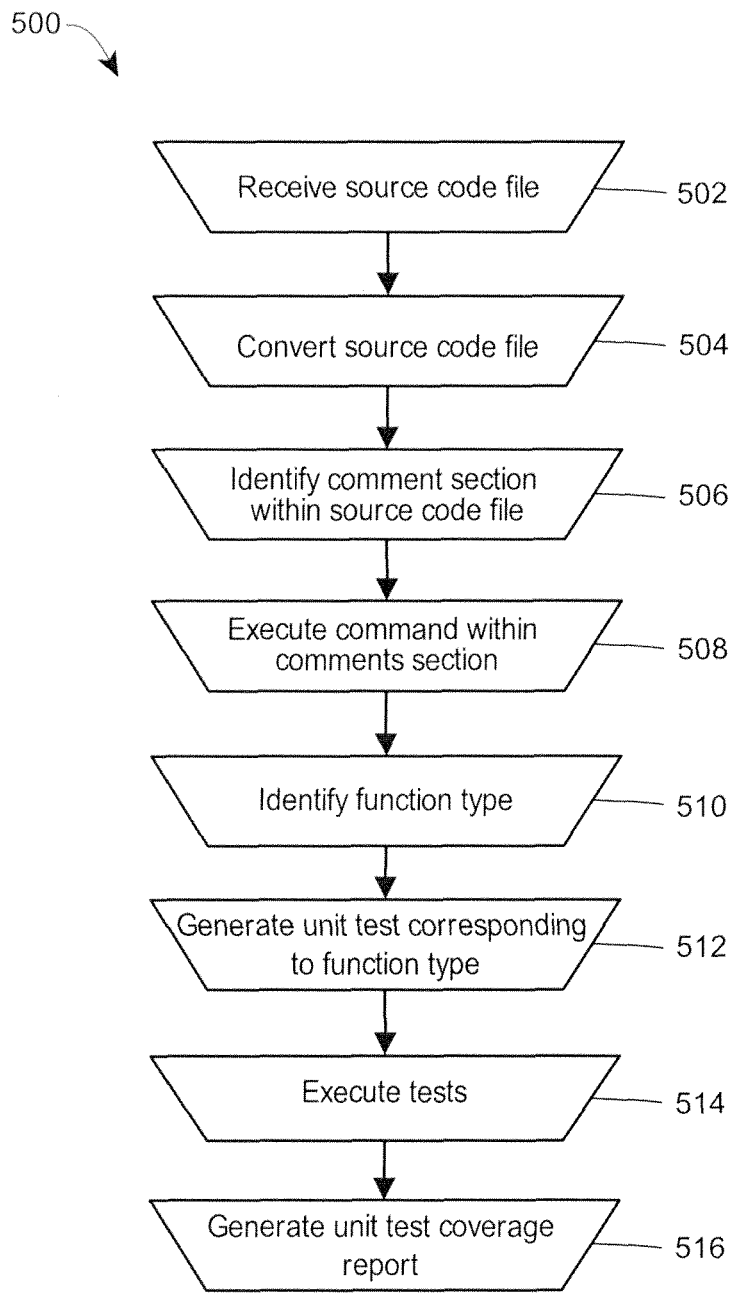
FIG. 5 illustrates an exemplary block diagram of a method for using the unit testing system in accordance with the described embodiments.

With reference to FIG. 5, the unit test generator system 100 described herein may be employed in a method 500 (FIG. 5) to generate unit tests for a source code file. The method 500 may include one or more functions or routines in the form of computer-executable instructions that are stored in a tangible computer-readable medium and executed using a processor of a computing device (e.g., a computing device being used or accessed by the developer 102). The routines may be included as part of any of the modules described in relation to FIG. 1, or as part of a module that is external to the system illustrated by FIG. 1.

At function 502, the system 100 may execute an instruction to receive a source code file 104. As described above, the source code file 104 may include a text file of computer code including one or more comments sections 200. The source code file may be created by the developer 102 using a general text editing program (e.g., notepad, WordPad®, etc.), an integrated development environment (IDE) (e.g., NetBeans®, CodeLite, JBuilder®, etc.), or other program executing on a computing device. The developer 102 may store the source code 104 within the local or remote database 106 as a text file or type of file, or the system 100 may receive the source code file 104 from an external source. The comments section 200 of the source code file 104 may include one or more unit descriptions 204 and be stored either internally or externally to the system 100.

At function 504, the system 100 may execute an instruction to retrieve a source code file 104 and convert the file 104 into another format for analysis by the system 100. For example, the function 504 may convert the file 104 into a searchable stream of text or other data, break the file 104 up into useful chunks of information (i.e., "tokenize" the source code file), or otherwise reformat the file 104.

At function 506, the system may execute an instruction to identify a comment section 200 and unit description 204 within the source code file 104. For example, using a data stream created at function 504, the function 506 may identify certain text characters that indicate a portion of the source code file 104 that includes the comments section 200, as described above. The unit description 204 may be identified within the comments section 200 by one or more keywords identified within the data stream or tokenized version of the source code file 104.

At function 508, the system 100 may execute an instruction corresponding to a command or keyword (e.g., commands 208 and 210) within the comments section 200. In some embodiments, the system 100 may use the identified command or keyword as a method input to perform another function. For example, if the function 508 identifies a "@code" command 208, then the function 508 may read the text following that command until the function 508 encounters another command to signal the function 508 to stop reading the text (e.g., the "@endcode" command). The "code" command 208 may also cause the function 508 to serialize or tokenize the text after the command 208 until the "@endcode" command 210 is read. The function 508 may also encounter other commands after an "@code" command. Other commands may signal the function 508 to perform other tasks such that the other commands may be nested between several "code" and "@endcode" commands. In some embodiments, the text between the "code" and "@endcode" commands includes the unit description 204. The unit description 204 may include a method description, a member variable description, a function, or other text that corresponds to the expected input and output of a unit of code (e.g., the "Vector3d.linear_combination" method 205) from the source code file 104.

At function 510, the system 100 may execute an instruction to identify a function type of the unit description 204 as read, serialized, or tokenized by the function 508 between the "@code" 208 and "@endcode" 210 commands. For example, if the function 510 identifies a "=" symbol within the unit description 204, the function 510 may identify the unit description 204 as a "setter" function. Further, if the function 510 serializes or tokenizes the unit description 204 and identifies the word "return", the function 510 may identify the unit description 204 as corresponding to a "getter" function. Of course, the function 510 may identify other types of functions depending on particular symbols, words, commands, keywords, etc., the function 510 identifies within the unit description 204.

At function 512, the system 100 may execute an instruction to generate a unit test corresponding to the function type identified by function 510. In some embodiments, the function 512 generates a unit test stub 300 that incorporates text from the comments section 200. For example, the unit test stub 300 may include a portion of the code from the unit description 204. The function 512 may generate other code for the stub 300 as well, such as raise, assert, or other code that corresponds to the type of function identified by function 510. If the function 510 identifies the unit description 204 as a "setter", then function 512 may generate a unit test 302 having commands corresponding to the "setter" instructions of the comments section 200. The function 512 may generate a plurality of unit tests or unit test stubs 300 corresponding to the typically encountered problems with units of the source code file 104 such as input boundary tests, bad input type tests, random input tests, negative tests, etc.

At function 514, the system 100 may execute an instruction to test each of the unit tests that were generated by function 512. In some embodiments, a test harness such as the TestUp module 114 may run each unit test within the unit test suite 112 to determine how much of the source code file 104 is properly tested. The function 514 may provide a pass, fail, or follow up indication for each unit test within the unit test suite 112.

Figure 4A:
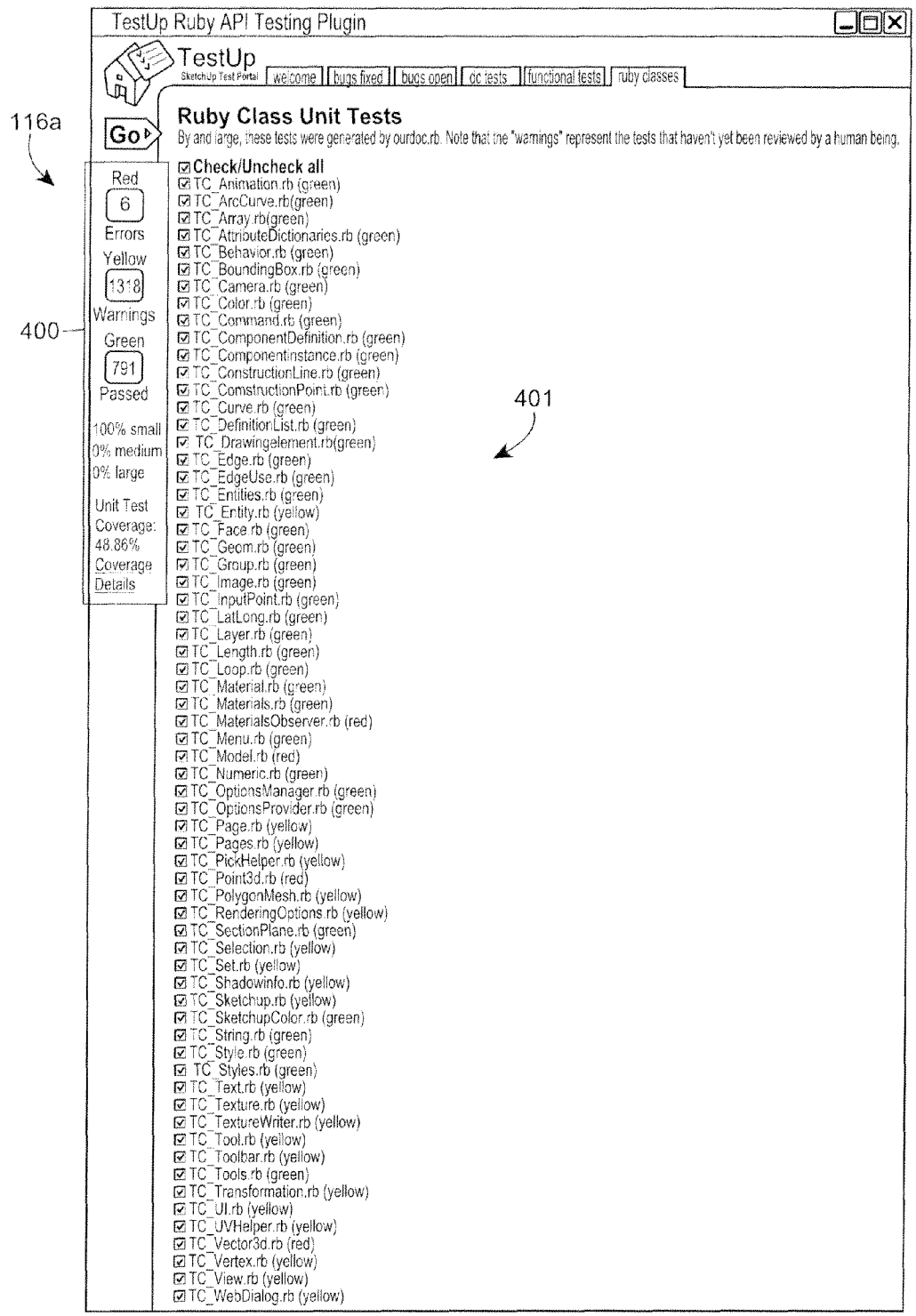
FIG. 4a illustrates an example unit test report in accordance with the described embodiments.
Figure 4B:
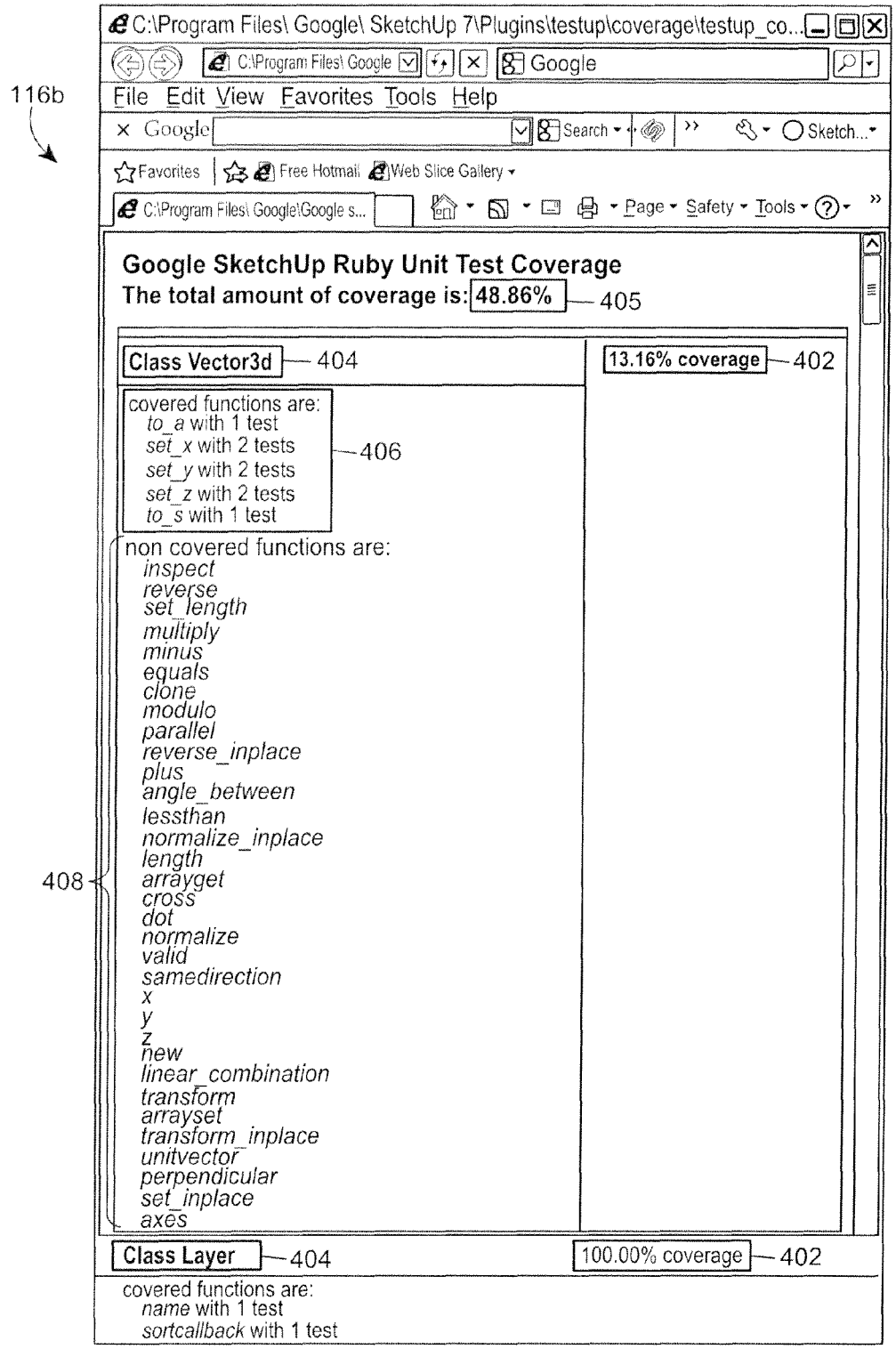
FIG. 4b illustrates another example unit test report in accordance with the described embodiments.

At function 516, the system 100 may execute an instruction to generate a unit test coverage reports 116a and 116b. As illustrated by FIGS. 4a and 4b, the reports 116a and 116b may include an indication of how much of the testing for the source code file 104 is complete and successful. In some embodiments, the function 516 modifies the appearance of the code within the unit test suite 112 such that a developer 102 or another module may easily determine if a unit test is complete. For example, if a unit test passes, requires follow up, or fails after being executed by the TestUp module 114, then the text corresponding to that test within the unit test suite 112 may be highlighted in green, yellow, red or another indication. The unit test coverage reports 116a and 116b may also include an indication of how thoroughly and effectively the unit test suite 112 tests the units identified within the source code file 104. For example, a unit test coverage report 116a (FIG. 4a) may include a summary section 400 as well as a summary of each unit's testing completion and success by a color or other indication of pass, fail, or follow up needed (e.g., green, red, and yellow, respectively). Further, a unit test report 116b (FIG. 4b) may include an indication of whether each unit test (e.g., unit tests 302, 308, 310) properly tests its corresponding unit 404 (i.e., the comments section 200 of the source code file 104), an indication of how many of the total number of unit tests described within the comments sections 200 of the source code file 104 are properly tested 406, a number that are not properly tested 408, and a coverage measure (for each unit 402 or the entire application 405) indicating how much of the testing process is complete, to name only a few of the indications that may be available in the report 116.

In some embodiments, the reporting module 117 parses the comments sections 200 of a source code file 104 to extract each method name 205 or class name, and copies each extracted method or class name to a list. The reporting module 117 may then compare the list of methods and classes against the method and classes tested by the TestUp module 114. The reporting module 117 may then receive a list of classes and methods that were tested by the TestUp module 114. The reporting module 117 may then compare the lists to the indication of whether each particular unit test passed to generate a measure of testing coverage 402 for each class. As described herein, the coverage measure 402 may generally describe how many units within a class are covered by unit tests that pass or succeed. Further, the report 116 may include a coverage measure of how many units within a class are covered by unit tests that pass.

Figure 6:
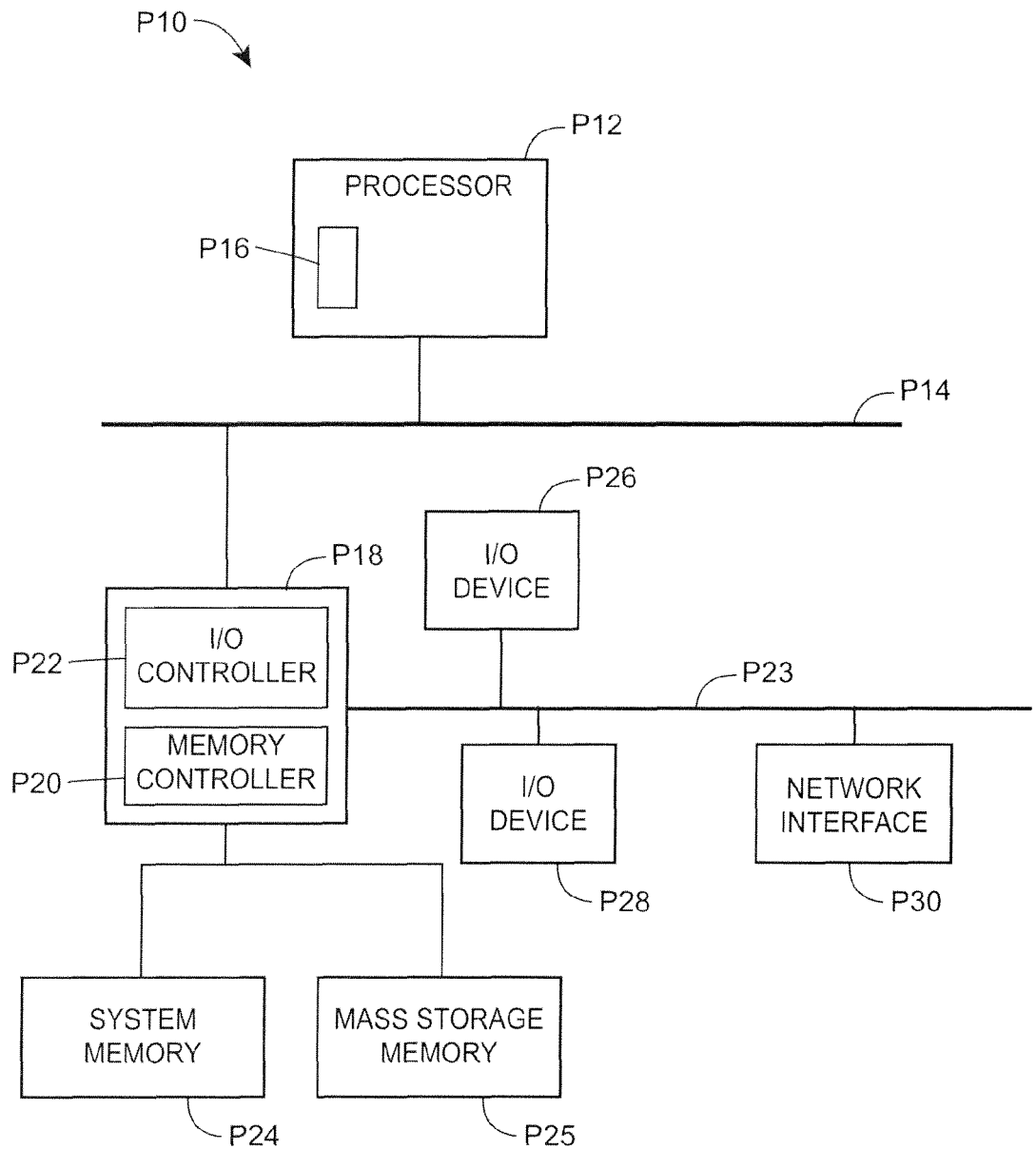
FIG. 6 illustrates a high-level block diagram of a computing environment that implements modules of the unit test generator in accordance with the described embodiments.

FIG. 6 is a block diagram of an example computer system P10 that may be used to implement the unit testing generation system 100 and the example methods described herein. For example, processor systems similar or identical to the example computer system P10 may be used to implement the example unit test generation system 100, the modules of FIG. 1, and the method of FIG. 5. Although the example computer system P10 is described below as including a plurality of peripherals, interfaces, chips, memories, etc., one or more of those elements may be omitted from other example processor systems used to implement the example unit test generation system 100.

As shown in FIG. 6, the computer system P10 includes a processor P12 that is coupled to an interconnection bus P14. The processor P12 includes a register set or register space P16, which is depicted in FIG. 6 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 6, the system P10 may be a multi-processor system and, thus, may include one or more additional processors that are identical or similar to the processor P12 and that are communicatively coupled to the interconnection bus P14.

The processor P12 of FIG. 6 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example computer system P10 is used to implement the unit test generation system 100 (FIG. 1), the mass storage memory P25 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms "module" and "routine" refer to computer program logic used to provide the specified functionality. Thus, a module or a routine can be implemented in hardware, firmware, and/or software. In one embodiment, program modules and routines are stored in mass storage memory P25, loaded into system memory P24, and executed by a processor P12 or can be provided from computer program products that are stored in tangible computer-readable storage mediums (e.g. RAM, hard disk, optical/magnetic media, etc.).

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the computer system P10 to communicate with another computer system.

While the memory controller P20 and the I/O controller P22 are depicted in FIG. 6 as separate functional blocks within the chipset P18, the functions performed by these blocks may be integrated within a single semiconductor circuit or may be implemented using two or more separate integrated circuits.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, functions, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "code," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating unit tests from the documentation and comments portions of high-level computer code through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A computer-implemented method for generating unit tests for source code, comprising:
   receiving a source code file including a comments section, the comments section including a keyword identifying a unit description;
   reading the unit description from the source code file, wherein the unit description follows the keyword;
   generating a unit test stub based on the unit description, wherein the unit test stub includes a declaration of a testing routine and parameters accepted by the testing routine, and wherein the parameters accepted by the testing routine are derived from the unit description;
   copying at least a portion of the unit description to the unit test stub;
   determining a source code function type corresponding to the unit description;
   automatically generating a first unit test, wherein the first unit test includes one or more instructions corresponding to the determined source code function type, and wherein the one or more instructions are not included in the source code file;
   automatically generating a second unit test, wherein the second unit test includes one or more instructions corresponding to the determined source code function type; and
   including the first unit test and the second unit test in the unit test stub.

2. The method of claim 1, wherein reading the unit description includes serializing and parsing the comments section.

3. The method of claim 2, further comprising identifying a keyword within the comments section and using the keyword to read the unit description.

4. The method of claim 1, wherein the source code function type includes at least one of a setter function, a getter function, and a member variable, and wherein the first unit test and the second unit test correspond to the at least one setter function, getter function, and member variable.

5. The method of claim 1, further comprising storing the unit test stub in a unit test suite.

6. The method of claim 1, wherein the unit test stub includes a trivial case test, a boundary input test, a bad input type test, a random input test, and a negative test.

7. The method of claim 1, further comprising:
   including, in the unit test stub, instructions that generate an error when executed; and
   determining whether the generated error matches a predetermined error response.

8. The method of claim 1, further comprising:
   automatically generating comments; and
   including the automatically generated comments in the unit test stub.

9. A non-transitory computer-readable medium storing instructions, the instructions when executed by a processor cause the processor to:
   receive a source code file including a comments section, the comments section including a keyword identifying a unit description, wherein the unit description corresponds to at least one of an input parameter and an output parameter of a source code unit and the unit description follows the keyword in the source code file;
   serialize the source code file;
   parse the serialized source code file to identify the keyword;
   generate a unit test stub based on the unit description, wherein the unit test stub includes a declaration of a testing routine and parameters accepted by the testing routine, and wherein the parameters accepted by the testing routine are derived from the unit description and correspond to the at least one of the input parameters and the output parameters of the source code unit;
   write at least a portion of the unit description following the keyword to the unit test stub;
   determine a source code function type corresponding to the unit description;
   automatically generate one or more instructions corresponding to the determined source code function type, wherein the generated one or more instructions are not included in the source code file; and include the one or more instructions corresponding to the determined source code function type in the unit test stub.

10. The non-transitory computer-readable medium storing the instructions of claim 9, wherein the source code function type includes at least one of a setter function, a getter function, and a member variable, and the one or more instructions corresponding to the determined source code function type correspond to the at least one setter function, getter function, and member variable.

11. A non-transitory computer-readable medium storing instructions, the instructions when executed by a processor cause the processor to:

receive a source code file including a keyword identifying a unit description, wherein the unit description corresponds to at least one of an input parameter and an output parameter of a source code unit and the unit description follows the keyword in the source code file;

parse the unit description to determine a source code function type corresponding to the unit description;

generate a unit test stub based on the unit description, wherein the unit test stub includes a declaration of a testing routine and parameters accepted by the testing routine, and wherein the parameters accepted by the testing routine are derived from the unit description;

copy the unit description to the unit test stub corresponding to the function type;

receive additional code to transform the unit test stub into a unit test corresponding to the source code unit, wherein the additional code includes one or more instructions corresponding to the source code function type, and wherein the one or more instructions are not included in the source code file;

execute the unit test; and generate a test result indication for each unit test.

12. A computer system for generating unit tests, the system comprising:

a processor;

a source code database interface module executable by the processor and configured to store in a database a plurality of source code files, each file including a keyword identifying a unit description, wherein the unit description corresponds to at least one of an input parameter and an output parameter of a source code unit and the unit description follows the keyword in the source code file;

a unit test generator module configured to read a unit description, to determine a function type corresponding to the unit description, to generate a unit test stub based on the unit description and the function type, to copy the unit description to the unit test stub, to automatically generate one or more instructions corresponding to the function type, and to include the one or more generated instructions corresponding to the function type in the unit test stub, wherein the generated one or more instructions are not included in the source code file;

a unit test suite configured to store a plurality of unit test stubs corresponding to each source code unit and to receive additional code to transform each unit test stub into a unit test corresponding to a source code unit; and a unit test harness configured to execute the plurality of unit tests and to provide a test result indication for each unit test.

13. The computer system of claim 12, wherein the unit test generator module is further configured to serialize and parse the comments section.

14. The computer system of claim 13, wherein the unit test generator module is further configured to identify a keyword within the comments section and to use the keyword to read the unit description.

15. The computer system of claim 12, wherein the function type includes at least one of a setter function, a getter function, and a member variable, and wherein the generated one or more instructions corresponding to the determined function type correspond to the at least one setter function, getter function, and member variable.

16. The computer system of claim 12, wherein the unit test stub includes a trivial case test, a boundary input test, a bad input type test, a random input test, and a negative test for each source code unit.

17. A computer-implemented method for generating unit tests for source code, comprising:

receiving a source code file including a keyword identifying a unit description, wherein the unit description corresponds to at least one of an input parameter and an output parameter of a source code unit and the unit description follows the keyword in the source code file;

parsing the unit description to determine a source code function type corresponding to the unit descriptions;

generating a unit test stub based on the unit description, wherein the unit test stub includes a declaration of a testing routine and parameters accepted by the testing routine, and wherein the parameters accepted by the testing routine are derived from the unit description;

copying the unit description to the unit test stub;

receiving additional code to transform the unit test stub into a unit test corresponding to the source code unit, wherein the additional code includes one or more instructions corresponding to the source code function type, and wherein the one or more instructions are not included in the source code file;

executing the unit test; and generating a test result indication for each unit test.

18. The computer-implemented method of claim 17, further comprising parsing the source code file to identify a keyword within the unit description and using the keyword to read the unit description.

19. The computer-implemented method of claim 17, wherein the source code function type includes at least one of a setter function, a getter function, and a member variable, and wherein the one or more instructions corresponding to the determined source code function type correspond to the at least one setter function, getter function, and member variable.

20. The computer-implemented method of claim 17, wherein the unit test stub includes a trivial case test, a boundary input test, a bad input type test, a random input test, and a negative test for each source code unit.

* * * * *